United States Patent [19]

Van den Broek

[11] 4,132,041

[45] Jan. 2, 1979

[54] TELESCOPIC APPARATUS

[76] Inventor: Bernardus C. Van den Broek, Juliana van Stolbergstraat 7, Weert, Netherlands

[21] Appl. No.: 845,916

[22] Filed: Oct. 27, 1977

[30] Foreign Application Priority Data

Nov. 8, 1976 [GB] United Kingdom ............... 46435/76

[51] Int. Cl.² .......................................... E04H 12/34
[52] U.S. Cl. .................................................... 52/118
[58] Field of Search .......................... 52/115, 117, 118; 160/62, 80, 188

[56] References Cited

U.S. PATENT DOCUMENTS

| 336,414 | 2/1886 | Kerr | 52/118 X |
|---|---|---|---|
| 3,722,154 | 3/1973 | Sakamoto | 52/115 X |

Primary Examiner—J. Karl Bell
Attorney, Agent, or Firm—Alter and Weiss

[57] ABSTRACT

A telescopic boom assembly including first and second telescoping members. The assembly employs rack and pinion telescoping mechanisms which are driven by hydraulically controlled piston and cylinder members. The combination provides positive and precise positioning of the telescoping members and extremely smooth movement thereof.

6 Claims, 7 Drawing Figures

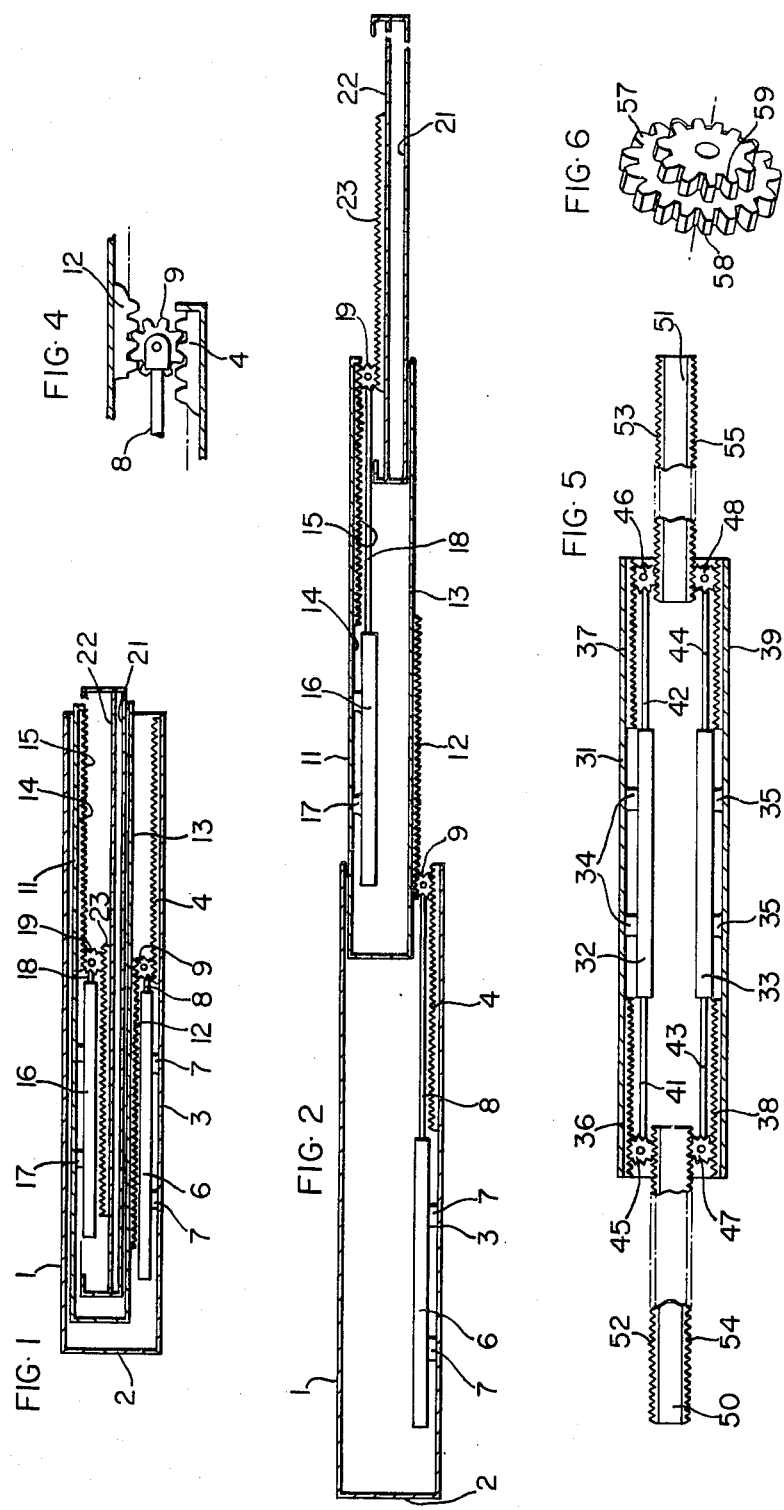

TELESCOPIC APPARATUS

This invention relates to telescopic apparatus and it has particular, though not exclusive, application to lifting apparatus employing a telescopically extending arm.

It has been the practice to control, by means of chains or cables, the extension and retraction of the members of a telescopic arm used for lifting apparatus such as cranes and aerial platforms.

Apparatus in accordance with the present invention employs a rack and pinion mechanism which is driven by a hydraulically controlled piston and cylinder assembly. The use of this combination results in an extremely smooth movement of the telescoping members and enables their positioning to be positive and precise.

Figure 7:
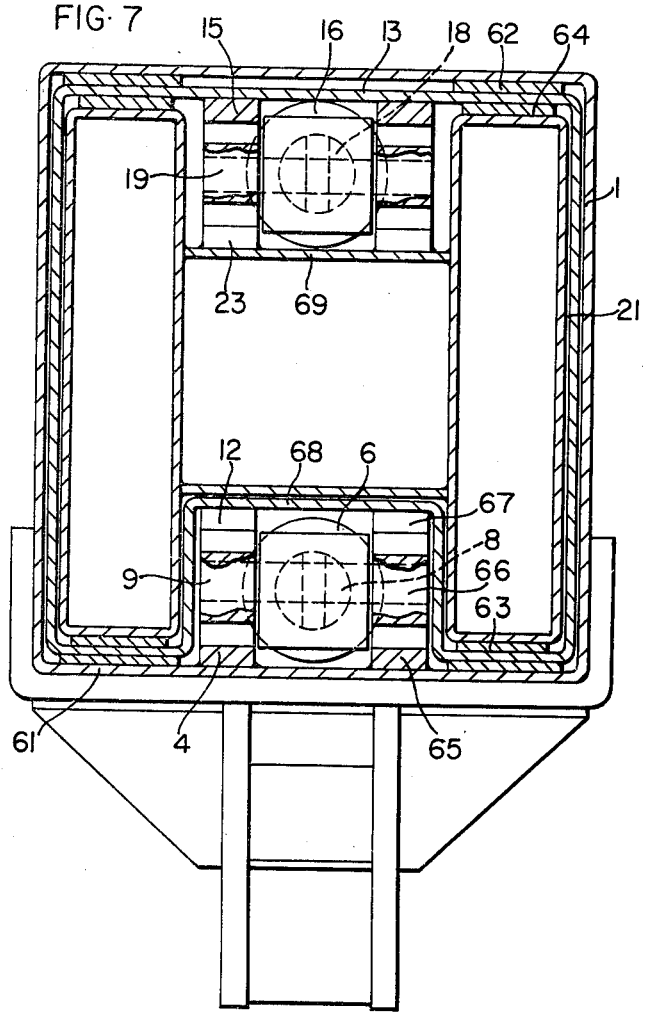
Figure 3:
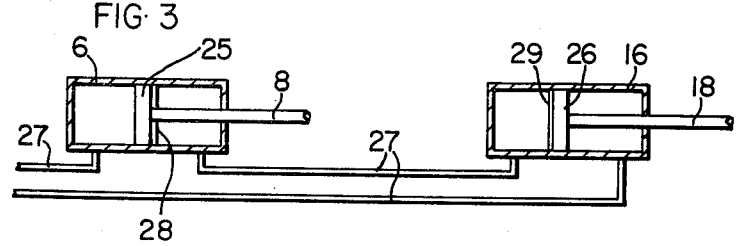

Embodiments of the invention will now be described, by way of example, with reference to the accompanying drawings in which:

FIGS. 1 and 2 are diagrammatic longitudinal sectional views of a first embodiment in the retracted and extended conditions respectively, FIG. 3 is a schematic diagram of a part of a hydraulic circuit, FIG. 4 is a diagrammatic longitudinal sectional view of a part of the arrangement of FIGS. 1 and 2, FIG. 5 is a diagrammatic longitudinal sectional view of a second embodiment in the extended condition, FIG. 6 is a perspective view of a pinion wheel, and FIG. 7 is a cross sectional view of a practical embodiment of the arrangement illustrated diagrammatically in FIGS. 1 and 2.

Referring to FIGS. 1 and 2, there is shown an outer member 1 of a telescopic boom assembly for a three section telescopic aerial platform. The member 1 will, in practice, be pivotally attached near to its end 2 to a base which will generally be the floor of a vehicle. The member 1 has a rectangular cross section and along the inner surface of the side 3 there are arranged a pair of parallel racks, one of which is visible at 4. A doubleacting hydraulically operated cylinder 6, which is also mounted upon the inner surface of the side 3, as indicated at 7, contains a piston (not shown) to which there is attached a rod 8 which carries a pinion wheel 9. The pinion wheel 9 meshes with the rack 4 and a second pinion wheel (not shown) also carried by the piston rod 8 meshes with the rack (not shown) which is parallel to the rack 4.

An intermediate member 11 of the telescopic boom assembly, which member 11 is also rectangular in crosssection carries a rack 12 on the outer surface of its side 13. The rack 12 meshes with the pinion wheel 9. Upon the inner surface of a side 14 of the member 11 there is a rack 15. A double acting hydraulically operated cylinder 16 is also mounted upon the inner surface of the side 14, as indicated at 17. The cylinder 16 contains a piston (not shown) and a piston rod 18 attached to the piston of the cylinder 16 carries a pinion wheel 19. The pinion wheel 19 meshes with the rack 15.

An inner member 21 of the telescopic boom assembly, which is also of rectangular cross section, has a side 22 on the outer surface of which there is a rack 23. The rack 23 cooperates with the pinion wheel 19.

It will be appreciated that the racks 12, 15 and 23 have duplicate parallel racks (not shown) which cooperate with pinion wheels (not shown) corresponding to the pinion wheels 9 and 19.

Referring to FIG. 3 there are shown diagrammatically the cylinders 6 and 16 and the corresponding piston rods 8 and 18. The piston rods 8 and 18 are attached to respective pistons 25 and 26. The cylinders 6 and 16 are connected hydraulically in series by means of hydraulic lines 27. It will be appreciated that in order to cause the pistons 25 and 26 to move at the same rate, the amounts of hydraulic fluid displaced by the surfaces 28 and 29 of the pistons 25 and 26 respectively for a given longitudinal movement of the rods 8 and 18 should be the same. It is therefore arranged that the area of the surface 28 of piston 25 should equal the area of the surface 29 of the piston 26.

Referring to FIG. 4, there is shown in more detail than is possible in FIGS. 1 and 2 the meshing of the pinion wheel 9 with the racks 4 and 12.

It will be appreciated that in operation the application of hydraulic fluid via the line 27 to the cylinder 6 in such a way that the piston 25 is moved to cause fluid to be forced by the surface 28 into the cylinder 16 and to act upon the surface 29 of the piston 26 will also result in the piston 8 and 18 being caused to move out of their respective cylinders and for the pinion wheel 9 to run along the rack 4 and the pinion wheel 19 to run along the rack 15. As a result of this action the reaction between the pinion wheel 9 and the rack 12 and the pinion wheel 19 and the rack 23 results in the intermediate member 13 and the inner member 21 being caused to extend out of the members 1 and 13 respectively. It will also be appreciated that, as a result of a well known physical fact, the member 13 will be caused to move linearly at twice the rate of the piston rod 8 and the member 21 will be caused to move linearly at twice the rate of the piston rod 18.

The retraction of the piston rods 8 and 18 into their respective cylinders results in the retraction of the members 13 and 21 into the outer member 1 until the position shown in FIG. 1 is reached.

It will be appreciated that the action is smooth and positive as a result of the mechanical coupling between the members.

Referring to FIG. 5 there is shown, diagrammatically, an arrangement including an intermediate member 31 of a three section telescopic boom assembly. The member 31 houses two double acting double hydraulically operated cylinders 32 and 33 which are attached to the member 31, as indicated at 34 and 35 respectively. The member 31 also carries racks 36, 37, 38 and 39. Each of the cylinders 32 and 33 houses two pistons (not shown) which are attached respectively to piston rods 41, 42, 43 and 44. The piston rods 41, 42, 43 and 44 carry respectively pinion wheels 45, 46, 47 and 48 which mesh with the racks 36, 37, 38 and 39 respectively.

Further boom members 50 and 51 carry racks 52, 54 and 53, 55 respectively which cooperate with pinion wheels 45, 47 and 46, 48 respectively.

It is thus possible by applying hydraulic fluid to the centre of the cylinders 32 and 33 to cause the pistons 41 and 43 to extend simultaneously with the pistons 42 and 44 from their respective cylinders and to cause the boom members 50 and 51 to be extended from within the member 31. The application of hydraulic fluid to the circuit in the reverse direction causes the boom members 50 and 51 to be withdrawn into the member 31.

FIG. 5 merely illustrates diagrammatically the principle of operation of the arrangement. It will be appreciated that by suitably shaping the cross sections of the members 50, 31 and 51, it is possible to give added strength to the members 50 and 51 and to enable them to perform part of a telescopic boom assembly.

It is not necessary that the pitch of the teeth on the racks which cooperate with a particular pinion wheel be the same. It is possible to obtain a mechanical gearing by employing a pinion wheel having one set of teeth with a first pitch to engage with one of the racks and a second set of teeth with a second pitch to engage with a second of the racks. Such a pinion wheel 57 having first teeth 58 of one pitch and second teeth 59 of another pitch is illustrated in FIG. 6.

Referring to FIG. 7, there is shown a cross section through a practical embodiment of the arrangement illustrated diagrammatically in FIGS. 1 and 2. Where possible, the same reference numerals will be used for parts which correspond to the parts illustrated in FIGS. 1 and 2.

The outer rectangular shaped member 1 of the telescopic boom assembly is spaced from the intermediate member 13 by spacers, such as those shown at 61 and 62. The member 1 carries racks 4 and 65 and the cylinder 6. The cylinder 6 has the piston 8 on one side of which there is the pinion wheel 9 cooperating with the rack 4 and on the other side of which there is a pinion wheel 66 cooperating with the rack 65. The intermediate member 13 carries the rack 12 and a corresponding rack 67 which cooperates with the pinion wheels 9 and 66 respectively. It will be noted that the member 13 has, in cross section, a re-entrant portion 68 which enables the cylinder 6 and piston 8, together with the cooperating pinion wheels 9 and 66 and the rack 4, 12, 65 and 67 to be housed within the member 1.

The inner member 21, which is spaced from the member 13 by spacers 63 and 64 has an H-shaped cross section which accommodates the re-entrant portion 68 of the intermediate member 13 and provides a re-entrant portion 69 which accommodates the piston 18 and cylinder 16 arrangement, together with the associated pinion wheel 19 and the racks 15 and 23 on the members 13 and 21 respectively. A duplicate pinion wheel is provided on the opposite side of the piston 18 to the pinion wheel 19 and cooperates with racks on the members 13 and 21 in a similar manner to the pinion wheel 66 and racks 65 and 67 of the arrangement already described.

It will be understood that the invention has been described, by way of example, with reference to particular embodiments and that variations, modifications and combinations thereof can be made within the scope of the invention.

For example, the particular cross sectional shapes of the members of the telescopic boom assembly shown in FIG. 7 can be varied in order to accommodate other designs of piston and cylinder and rack and pinion arrangement, or in order to provide a variation in the strength of one or more of the members.

It will also be appreciated that, although in the embodiments described, the arrangements are such that the boom members 11 and 21 move at equal rates with respect to the member 1, it would be possible, by dimensioning the hydraulic cylinders and circuits in a different way from the embodiments described, to cause the boom members to move at different rates with respect to one another.

Furthermore, the relative movement between boom members can be produced by arranging the rack and pinion mechanism in a different way from that shown. For example, the rack 12 could be formed on the side of a cylinder which is incorporated in the member 11 and which replaces the cylinder 6, the piston rod of the cylinder being anchored at its outer end to the boom member 1 and the pinion wheel 9 being freely rotatable between the racks 4 and 12. Alternatively a cylinder replacing the cylinder 6 may be incorporated at some other position in the member 11 with the outer end of its piston rod anchored to the boom member 1 and the pinion wheel 9 being freely rotatable between the racks 4 and 12.

In yet a further method of producing relative longitudinal movement between two of the boom members, a pinion wheel, which is in engagement with two racks which are associated respectively with the boom members, is rotatably driven, for example by a motor, either with or without movement of its axis longitudinally in the direction of movement of the booms, to cause the desired relative longitudinal movement of the booms.

While the principles of the invention have been described above in connection with specific apparatus and applications it is to be understood that this description is made by way of example only, and not as a limitation on the scope of the invention.

I claim:

1. A telescopic boom assembly including a first boom member,
    a second boom member telescoping within said first boom member,
    said boom assembly having a retracted position wth said second boom member telescoped within said first boom member and an extended position with said second boom member extended from said first boom member,
    a first rack fixed onto said first boom member adjacent one end thereof and extending toward the middle thereof,
    a second rack fixed onto said second boom member,
    the beginning of said second rack being adjacent to the end of said first rack when said second boom member is in the retracted position,
    a first cylinder fixed into said first boom member,
    a piston within the cylinder,
    a piston rod attached to the piston and extending from the cylinder,
    a rotatable pinion wheel attached to the piston rod, and
    said rotatable pinion wheel meshing with both said first and second racks and said first and second racks being positioned so that when said piston rod is moved from a retracted to an extended position, said pinion wheel moves along said first rack and forces said second rack outward to cause said second boom member to move to the extended position.

2. A telescopic boom assembly as claimed in claim 1 including a third telescoping boom member,
    the third boom member telescoping into the second boom member,
    a third rack and a fourth rack fixed relative to the second and third boom members, respectively,
    a second pinion wheel rotatably arranged between the third and fourth racks and means to move the second and third boom members longitudinally relative to one another by moving the second pinion wheel longitudinally and rotatably between the said third and fourth racks.

3. A telescopic boom assembly as claimed in claim 1 including a first pinion wheel having a first set of teeth of a first pitch to engage the first rack and a second set of teeth of a second pitch to engage the second rack.

4. A telescopic boom assembly as claimed in claim 2 including a second cylinder fixed relative to one of the said second and third boom members, a second piston within the second cylinder and a second piston rod attached to the second piston, the second piston rod being also attached to the second pinion wheel.

5. A telescopic boom assembly as claimed in claim 4 including a double-acting cylinder constituting the first and second cylinders.

6. A telescopic boom assembly as claimed in claim 4 in which the first and second pistons have operating surfaces of the same area and the first and second cylinders are connected in series, the fluid output from one of the cylinders being connected to the fluid input of the other cylinder.

* * * * *